United States Patent
Olson et al.

(10) Patent No.: US 7,298,491 B2
(45) Date of Patent: Nov. 20, 2007

(54) MAGNETIC COMPENSATORS FOR FIBER OPTIC GYROSCOPES

(75) Inventors: Matthew A. Olson, Glendale, AZ (US); Charles H. Lange, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 354 days.

(21) Appl. No.: 11/010,217

(22) Filed: Dec. 10, 2004

(65) Prior Publication Data

US 2006/0126072 A1    Jun. 15, 2006

(51) Int. Cl.
   *G01C 19/72*   (2006.01)
(52) U.S. Cl. ........................... 356/460; 356/465
(58) Field of Classification Search ........... 356/460, 356/465
   See application file for complete search history.

(56) References Cited

U.S. PATENT DOCUMENTS

| | | | |
|---|---|---|---|
| 5,333,214 A | | 7/1994 | Huang et al. |
| 5,608,524 A | * | 3/1997 | Blake ........................ 356/460 |
| 6,040,908 A | * | 3/2000 | Rahn et al. ................ 356/465 |
| 6,211,963 B1 | * | 4/2001 | Kaliszek et al. ........... 356/465 |

* cited by examiner

*Primary Examiner*—Samuel A. Turner (57) ABSTRACT

A fiber optic gyroscope (FOG) includes a sensing coil with a particular magnetic sensitivity magnitude and direction with respect to the geometric axis of the sensing coil. The FOG also includes a plurality of magnetic compensators. Each magnetic compensator is fabricated so as to have a particular magnetic sensitivity magnitude and direction, the magnitude being comparable to that of the sensing coil, with large tolerances relative to the magnitude and direction. The compensators are positioned relative to one another and to the sensing coil such that the combined magnetic sensitivities of the compensators cancel the magnetic sensitivity of the sensing coil.

29 Claims, 5 Drawing Sheets

MAGNETIC COMPENSATORS FOR FIBER OPTIC GYROSCOPES

GOVERNMENT INTEREST

The present invention was developed with support from the U.S. government under Contract No. N00030-02-C-0011 with the U.S. Department of the Navy. Accordingly, the U.S. government has certain rights in the present invention.

TECHNICAL FIELD

This application relates in general to fiber optic gyroscopes and, more specifically, to magnetic compensators for such gyroscopes.

BACKGROUND

A fiber optic gyroscope (FOG) is a device used to sense rotation by detecting phase shift differences between two interfering, counter-propagating beams of light. As is well-known to those of ordinary skill in the art, FOGs exhibit bias offset errors in the presence of magnetic fields. These bias offset errors are caused by fiber twist, which occurs naturally and inevitably during the FOG manufacturing process.

One common approach for reducing the influence of magnetic fields is to encase certain components of the FOG in a housing comprising magnetic shielding material, which is designed to protect sensitive components of the FOG from magnetic field effects. This approach, however, presents a number of drawbacks. For example, such magnetic shielding material increases both the weight and the cost of a FOG. In addition, it is typically infeasible to encase a FOG with sufficient shielding material to completely isolate sensitive components from the influence of ambient magnetic fields.

Another approach for reducing the influence of magnetic fields is to add optical components, or compensators, to the FOG which are specifically designed to compensate for the bias offset errors experienced in the presence of ambient magnetic fields. This approach typically involves a complex and demanding fabrication process in which, first, the axial and tangential components of the overall magnetic sensitivity of a FOG are determined. Then, two discrete compensators are designed and fabricated to exactly match and cancel each of these components independently, i.e., a first compensator is designed and fabricated to cancel the axial magnetic sensitivity component, and a second compensator is designed and fabricated to cancel the tangential magnetic sensitivity component.

This approach also presents a number of drawbacks. For example, the approach requires that each compensator be fabricated in accordance with extremely tight tolerances both for the magnitude and the orientation of its sensitivity. In addition, by using this approach, the assembly process for a FOG involves tight tolerances on the mechanical alignment of the compensators, both to assure cancellation of the sensitivity along the axis of the compensator and to avoid introducing sensitivity along the orthogonal axes. Given the tight tolerances associated with this approach, the result is a very labor-intensive and iterative process to continually adjust the sensitivities until an acceptable compensation level is achieved. Moreover, even using state-of-the-art fabrication techniques, there are limitations on the ability to fabricate compensators with specific sensitivities. As a result, the ultimate performance of such compensators is limited.

SUMMARY OF THE INVENTION

The above-mentioned drawbacks associated with FOG magnetic compensators are addressed by embodiments of the present invention and will be understood by reading and studying the following specification.

In one embodiment, a fiber optic gyroscope comprises a sensing coil having a magnetic sensitivity with a particular magnitude and a direction relative to the geometric axis of the sensing coil. The fiber optic gyroscope further comprises a first compensator having a magnetic sensitivity comparable in magnitude to that of the sensing coil and a second compensator having a magnetic sensitivity comparable in magnitude to that of the sensing coil and of the first compensator. The first compensator and the second compensator are positioned relative to one another and to the sensing coil such that the combined magnetic sensitivities of the compensators cancel the magnetic sensitivity of the sensing coil. Neither compensator must precisely match the axial or tangential components of the magnetic sensitivity of the sensing coil.

In another embodiment, a fiber optic gyroscope comprises a sensing coil with a particular magnetic sensitivity magnitude and direction with respect to the geometric axis of the sensing coil, and a plurality of magnetic compensators. Each magnetic compensator is fabricated so as to have a particular magnetic sensitivity magnitude and direction, the magnitude being comparable to that of the sensing coil, with large tolerances relative to the magnitude and direction. The compensators are positioned relative to one another and to the sensing coil such that the combined magnetic sensitivities of the compensators cancel the magnetic sensitivity of the sensing coil.

In another embodiment, a method of fabricating a fiber optic gyroscope comprises fabricating a sensing coil having a magnetic sensitivity with a measurable magnitude and a direction relative to the geometric axis of the sensing coil, and providing a plurality of pre-fabricated compensators having magnetic sensitivities comparable in magnitude to that of the sensing coil. The method further comprises positioning two or more of the compensators relative to one another and to the sensing coil such that the combined magnetic sensitivities of the compensators cancel the magnetic sensitivity of the sensing coil.

In another embodiment, a method of assembling a fiber optic gyroscope comprising a sensing coil, a first compensator, and a second compensator is implemented. The method comprises positioning the sensing coil, the first compensator, and the second compensator in initial positions, wherein each of the sensing coil, first compensator, and second compensator has a magnetic sensitivity with an axial component and a tangential component. The method further comprises positioning the geometric axes of the sensing coil and first compensator substantially parallel and the geometric axis of the second compensator non-parallel to the geometric axis of the sensing coil and the first compensator, rotating the second compensator about its own geometric axis until the sum of the axial components of the magnetic sensitivities is substantially zero, and rotating the first and second compensators about an axis substantially parallel to the geometric axis of the sensing coil until the sum of the tangential components of the magnetic sensitivities is substantially zero.

The details of one or more embodiments of the claimed invention are set forth in the accompanying drawings and the description below. Other features and advantages will become apparent from the description, the drawings, and the claims.

BRIEF DESCRIPTION OF THE DRAWINGS

FIG. 2A illustrates components of a FOG comprising magnetic compensators implemented in accordance with another embodiment of the present invention.

Like reference numbers and designations in the various drawings indicate like elements.

DETAILED DESCRIPTION OF THE PREFERRED EMBODIMENT

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Figure 1A:
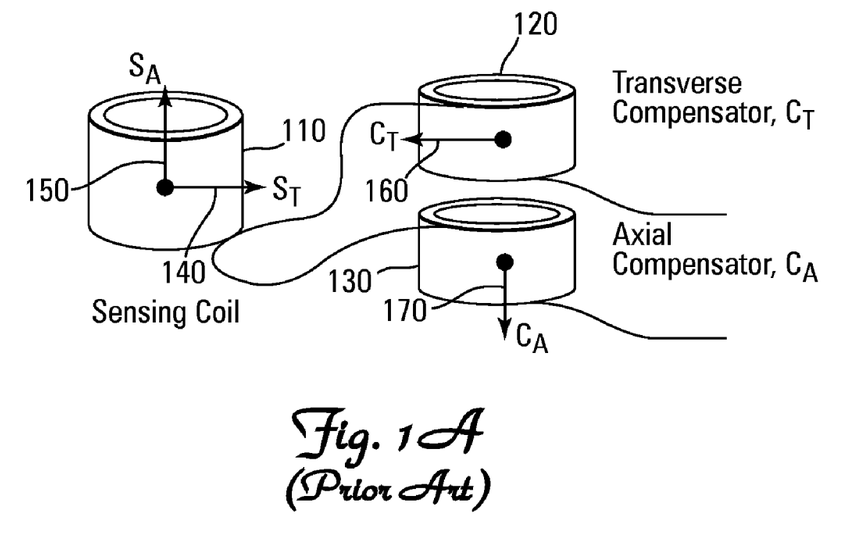
FIG. 1A illustrates components of a FOG in which conventional magnetic compensators and fabrication techniques are implemented.
Figure 1B:
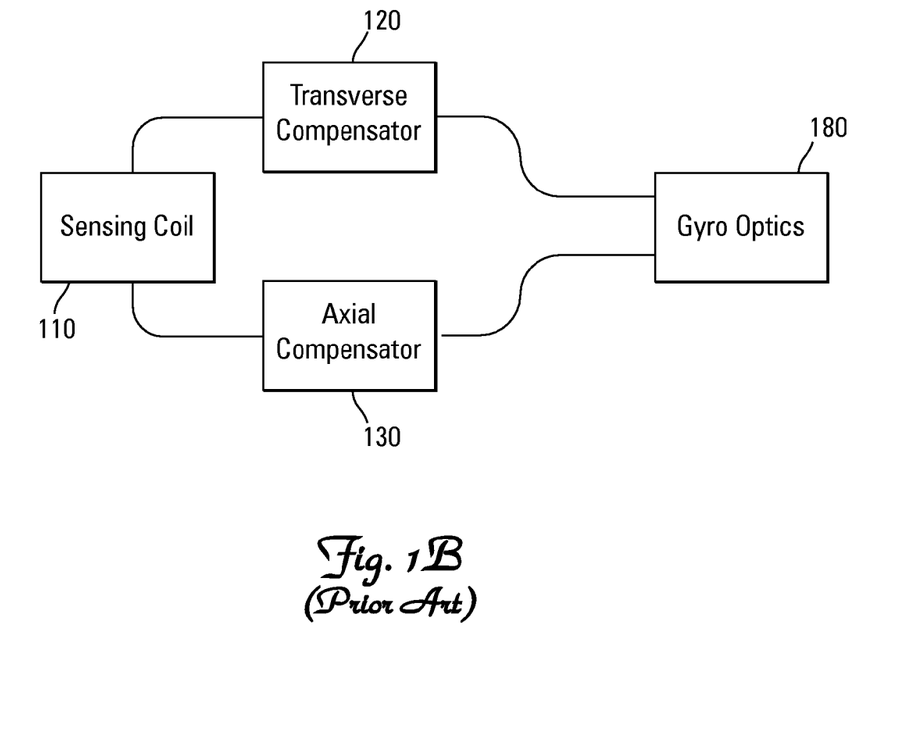
FIG. 1B is a block diagram of a compensation system of the prior art including the FOG and conventional compensators of FIG. 1A.

FIG. 1B illustrates components of a FOG in which conventional magnetic compensators and fabrication techniques are implemented. The components illustrated in the embodiment of FIG. 1B include a sensing coil 110, a transverse compensator 120, and an axial compensator 130. As is well-known to those of ordinary skill in the art, the sensing coil 110 exhibits a magnetic sensitivity, S, which characterizes the bias offset error experienced in the presence of ambient magnetic fields. The compensators 120, 130 are added to the optical circuit to passively cancel the magnetic sensitivity of the sensing coil 110. The optical circuit 180 is illustrated in the block diagram in FIG. 1B. Using the conventional magnetic compensators and methods illustrated in FIG. 1A, this magnetic sensitivity is decomposed into orthogonal vectors representing a tangential magnetic sensitivity component 140, labeled $S_T$, and an axial magnetic sensitivity component 150, labeled $S_A$, which are, respectively, perpendicular to and parallel to the geometric axis of the sensing coil 110.

Unlike the sensing coil 110, the compensators 120, 130 preferably exhibit magnetic sensitivity in only one direction. Specifically, the transverse compensator 120 preferably exhibits only a tangential magnetic sensitivity 160, labeled $C_T$, and virtually no axial magnetic sensitivity, whereas the axial compensator 130 preferably exhibits only an axial magnetic sensitivity 170, labeled $C_A$, and virtually no tangential magnetic sensitivity.

The magnitudes of $S_T$ and $S_A$ are determined after the sensing coil 110 is fabricated. Once these magnitudes have been determined, the transverse compensator 120 and axial compensator 130 are designed such that their magnetic sensitivities exactly match the sensitivity components of the sensing coil 110 they are intended to cancel. In other words, the transverse compensator 120 is designed such that the magnitude of $C_T$ exactly matches the magnitude of $S_T$, and the axial compensator 130 is designed such that the magnitude of $C_A$ exactly matches the magnitude of $S_A$.

Once the compensators 120, 130 have been designed, they must be fabricated in conformance with exacting standards to satisfy extremely tight tolerances both for the magnitude and the orientation of $C_T$ and $C_A$, respectively. Then, the sensing coil 110, transverse compensator 120, axial compensator 130, and other components of the FOG can be assembled using a variety of conventional techniques that are well-known and well-understood by those of ordinary skill in the art.

Because the magnetic sensitivities of the compensators 120, 130 are affected by fiber twist, which occurs inevitably and cannot be controlled completely using currently-available fabrication techniques, at least slight deviations from the design values in $C_T$ and $C_A$ are bound to occur during the fabrication process. As a result, the fabrication of the compensators 120, 130 is typically an iterative process of measuring and adjusting the respective magnetic sensitivities of the compensators 120, 130 until an acceptable level of compensation is achieved. This time-consuming and labor-intensive process adds considerable cost and complexity to the overall FOG fabrication process. In addition, the inability to fabricate compensators with precisely-controlled magnetic sensitivities inherently limits the ultimate performance of such compensators. The systems and methods described below address these and other shortcomings associated with conventional magnetic compensators.

Figure 2A:
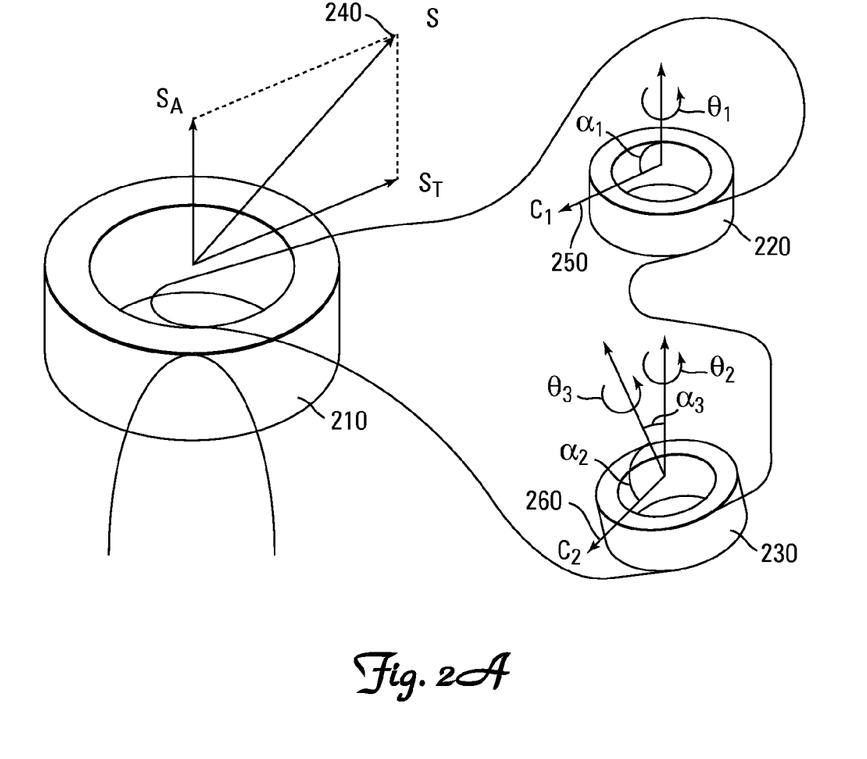
FIG. 2A illustrates components of a FOG comprising magnetic compensators implemented in accordance with one embodiment of the present invention.
Figure 2B:
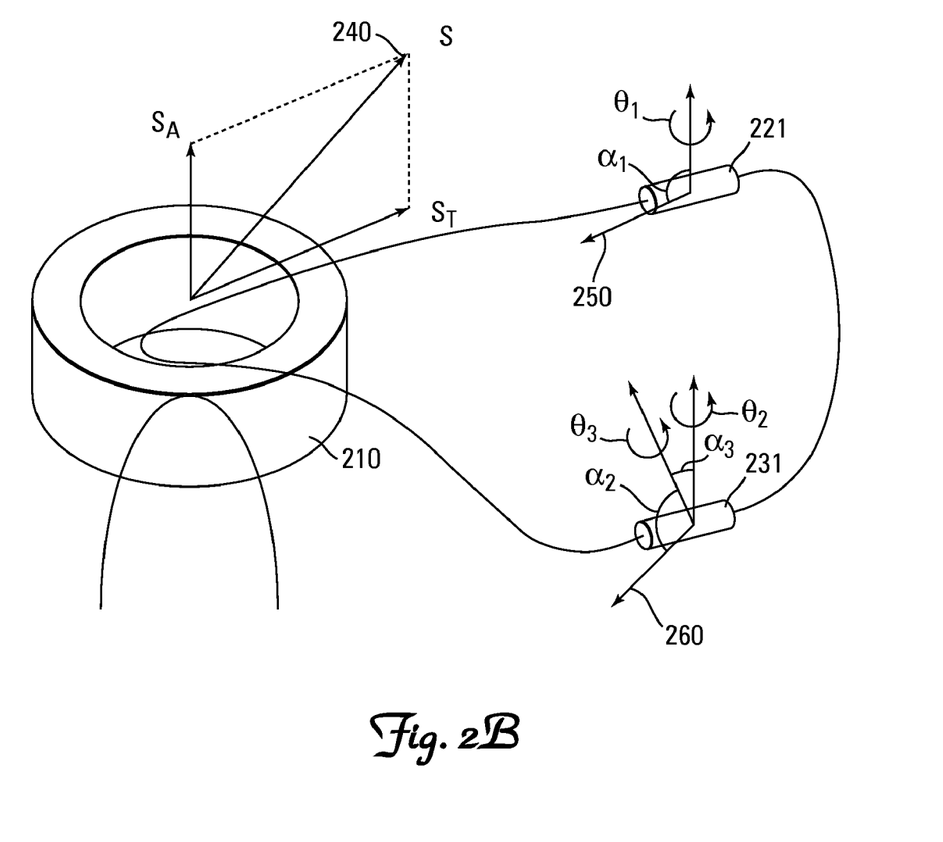

FIG. 2A illustrates components of a FOG comprising magnetic compensators implemented in accordance with one embodiment of the present invention. In the illustrated embodiment, the components include a sensing coil 210, a first compensator 220, and a second compensator 230. The sensing coil 210 is conventional and can be designed and fabricated using a variety of well-known techniques. In some embodiments, the compensators 220, 230 comprise coiled and twisted lengths of optical fiber. The compensators 220, 230 are preferably optical devices comprising a suitable material, such as, for example, bismuth iron garnet, which has magnetic sensitivity due to the Faraday effect. This example is illustrated in FIG. 2B wherein compensators 221 and 231 are made of bismuth iron garnet.

As discussed above, the sensing coil 210 exhibits a magnetic sensitivity 240, which characterizes the bias offset error experienced in the presence of ambient magnetic fields. The total magnetic sensitivity 240, S, can be decomposed into orthogonal vectors, $S_A$ and $S_T$, which are parallel to and perpendicular to the geometric axis of the sensing coil 210, respectively. However, unlike the conventional approach described above, separate compensators are not designed and built to cancel the tangential and axial components of S independently (i.e., one compensator to cancel $S_A$ and another compensator to cancel $S_T$). Rather, compensation is achieved by positioning the compensators 220, 230 relative to one another and to the sensing coil 210 such that the combination of their respective magnetic sensitivities 250, 260, labeled $C_1$ and $C_2$, passively cancels the overall magnetic sensitivity 240 of the sensing coil 210. This process can be modeled in vector space as a simple addition of all the vectors such that the sum of all sensitivities is zero.

Figure 3:
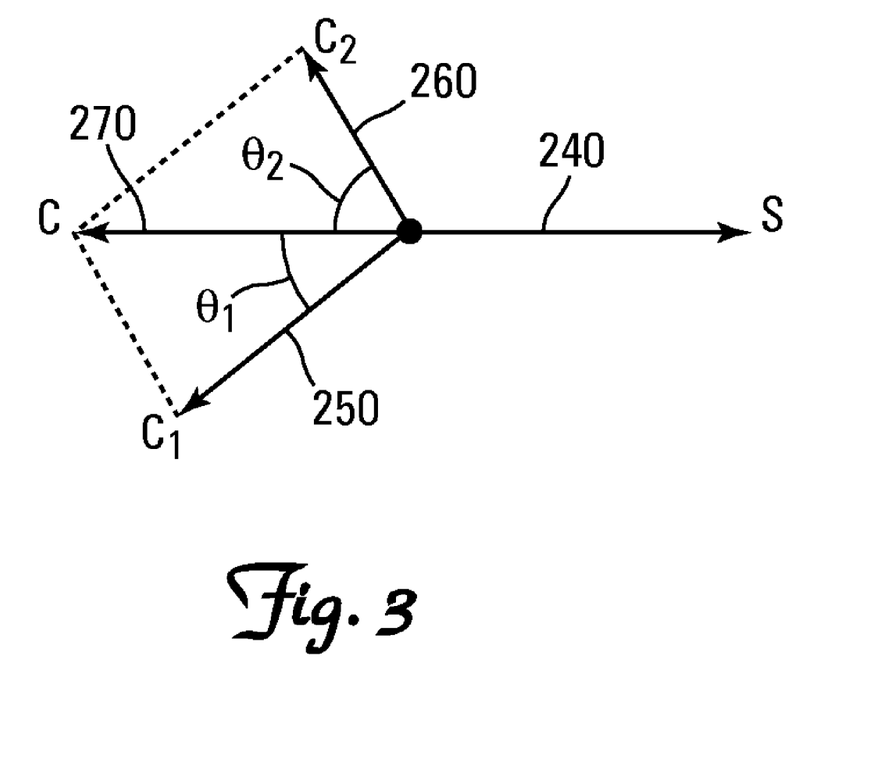
FIG. 3 is a vector space representation of the magnetic sensitivity of the sensing coil and the magnetic sensitivities of the compensators.

For example, FIG. 3 is a vector space representation of the magnetic sensitivity 240 (S) of the sensing coil 210 and the magnetic sensitivities 250, 260 ($C_1$ and $C_2$) of the compensators 220, 230. For simplicity, FIG. 3 illustrates the two-dimensional case in which S, $C_1$, and $C_2$ lie in a single plane. As illustrated in FIG. 3, angles $\theta_1$ and $\theta_2$ can be adjusted such that the vector sum of $C_1$ and $C_2$ create an overall compensator sensitivity 270, labeled C, which has the same magnitude as the sensitivity 240, S, of the sensing coil 210, but is oriented in the opposite direction.

Mathematically, the vectors can be decomposed into the ordinal coordinates such that the following two equations can be defined:

$$C_1 \cos(\theta_1) + C_2 \cos(\theta_2) + S = 0$$

$$C_1 \sin(\theta_1) + C_2 \sin(\theta_2) = 0$$

In these equations, $C_1$, $C_2$, and S are defined by the component sensitivities, while $\theta_1$ and $\theta_2$ are variables to be adjusted at the time of assembly. In the two-dimensional scenario illustrated in FIG. 3, there are two equations which need to be forced to zero, and there are two variables to be adjusted, $\theta_1$ and $\theta_2$. Therefore, as long as the magnitude of any one sensitivity, $C_1$, $C_2$, or S, is not larger than the sum of the other two, the equations can be forced to be equal to zero.

This relationship enables the compensators 220, 230 to be designed and fabricated with considerably greater flexibility than previously available because, unlike conventional compensators, $C_1$ and $C_2$ do not need to fall within very tight margins to cancel S effectively. Rather, the compensators 220, 230 can perform their intended functions if the magnitudes of $C_1$ and $C_2$ are merely comparable to that of S. This increased flexibility advantageously enables the compensators 220, 230 to be produced in advance of characterization of the sensing coil rather than having to be individually designed, built, and calibrated for every individual sensing coil 210.

In the three-dimensional case, illustrated in FIG. 2, an additional degree of freedom is added, which allows for the sum of the sensitivities in the third axis to be made equal to zero. Complete cancellation can still be achieved with only two compensators 220, 230, because no single compensator 220, 230 is required to cancel the magnetic sensitivity 240 of the sensing coil 210 in any particular direction. For example, in one embodiment, the sensing coil 210 and two compensators 220, 230 can be arranged in the configuration illustrated in FIG. 2. In other embodiments, alternative configurations can be implemented or more compensators can be utilized to achieve the same effect of complete cancellation of the magnetic sensitivity 240, S, of the sensing coil 210.

While in the illustrated embodiment, both compensators 220, 230 have a large tangential sensitivity and small axial sensitivity, this is not necessary. In other embodiments, one or more compensators may have a large axial sensitivity and small tangential sensitivity, or a sensitivity comprising significant tangential and axial components. Angles $\alpha_1$ and $\alpha_2$ represent the orientation of the total sensitivity of each compensator 220, 230 with respect to its geometric axis.

During assembly, the compensators 220, 230 can be rotated relative to one another and to the sensing coil 210 in a wide variety of ways. For example, in one embodiment, the first compensator 220 can be rotated about an axis parallel to the geometric axis of the sensing coil 210, as indicated by $\theta_1$; the second compensator 230 can be rotated about its own geometric axis, as indicated by $\theta_3$, and about an axis parallel to the geometric axis of the sensing coil 210, as indicated by $\theta_2$. In some embodiments, the angle $\alpha_3$ between rotation axes $\theta_2$ and $\theta_3$ is non-zero and fixed, whereas in other embodiments, this angle may be adjustable.

One exemplary method of positioning the compensators 220, 230 during the assembly process is described below. In this example, the compensators 220, 230 are arranged as illustrated in the embodiment of FIG. 2. First, the overall axial sensitivity is canceled by rotating the second compensator 230 such that $\theta_3$ is adjusted until the axial component of $C_2$ cancels the sum of the axial components of S and $C_1$. Mathematically, this step is described by the following equation:

$$C_1 \cos(\alpha_1) + C_2 \cos(\alpha_2) \cos(\alpha_3) + C_2 \sin(\alpha_2) \sin(\theta_3) \sin(\alpha_3) + S_A = 0$$

Following this step, $\theta_3$ is fixed. Then, the overall tangential sensitivity is canceled by adjusting $\theta_1$ and $\theta_2$ until the sum of all the tangential sensitivities equals zero, as described by the following two equations:

$$C_1 \sin(\alpha_1)\sin(\theta_1) + C_2 \cos(\alpha_2)\sin(\alpha_3)\sin(\theta_2) + C_2 \sin(\alpha_2)\cos(\theta_3)\cos(\theta_2) + C_2 \sin(\alpha_2)\sin(\theta_3)\cos(\alpha_3)\sin(\theta_2) + S_T = 0$$

$$C_1 \sin(\alpha_1) \cos(\theta_1) + C_2 \cos(\alpha_2) \sin(\alpha_3) \cos(\theta_2) + C_2 \sin(\alpha_2) \cos(\theta_3) \sin(\theta_2) + C_2 \sin(\alpha_2) \sin(\theta_3) \cos(\alpha_3) \cos(\theta_2) = 0$$

Although this exemplary method of positioning the compensators 220, 230 during the assembly process is an effective approach for canceling the magnetic sensitivity 240, S, of the sensing coil 210, there are many other methods that could be implemented in alternative embodiments.

The magnetic compensators and FOG assembly techniques described above present a number of distinct advantages over traditional approaches. First, the compensators do not need to be built to match the sensitivity of the sensing coil to within very tight tolerances, as is required when using conventional compensators and techniques. Second, the compensators and methods described above result in relaxed requirements on the mechanical alignment of the compensators and the sensing coil within the FOG. Third, generic compensators with sensitivities comparable in magnitude to that expected of the sensing coil can be mass-produced in advance, and two such compensators can be arranged at the time of assembly to effectively cancel the magnetic sensitivity of the sensing coil.

These magnetic compensators can perform their intended functions more effectively than traditional compensators because it is much easier to control the position and orientation of a compensator precisely and accurately than it is to control the exact magnitude of the compensator's magnetic sensitivity. Accordingly, using the compensators and methods described above dramatically increases flexibility in the design, fabrication, and assembly of magnetic compensators. This increased flexibility advantageously simplifies the overall FOG fabrication process, thereby significantly reducing both the time and the cost associated with the process and increasing yields.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A fiber optic gyroscope comprising:
   a sensing coil having a magnetic sensitivity with a particular magnitude and a direction relative to the geometric axis of the sensing coil;
   a first compensator having a magnetic sensitivity comparable in magnitude to that of the sensing coil; and
   a second compensator having a magnetic sensitivity comparable in magnitude to that of the sensing coil and of the first compensator,
   wherein the first compensator and the second compensator are positioned relative to one another and to the sensing coil such that the combined magnetic sensitivities of the compensators cancel the magnetic sensitivity of the sensing coil,
   and wherein neither compensator precisely matches the axial nor tangential components of the magnetic sensitivity of the sensing coil.

2. The fiber optic gyroscope of claim 1, wherein the first compensator and the second compensator comprise coiled and twisted lengths of optical fiber.

3. The fiber optic gyroscope of claim 1, wherein the first compensator and the second compensator are optical devices comprising a material having a magnetic sensitivity due to the Faraday effect.

4. The fiber optic gyroscope of claim 3, wherein the first compensator and the second compensator comprise bismuth iron garnet.

5. The fiber optic gyroscope of claim 1, wherein the magnitude of the magnetic sensitivity of any one of the first compensator, second compensator, or sensing coil is not larger than the sum of the magnitudes of the other two.

6. The fiber optic gyroscope of claim 1, wherein the first compensator can be rotated about a first rotation axis, $\theta_1$, which is substantially parallel to the geometric axis of the sensing coil, and the second compensator is rotated about a second rotation axis, $\theta_2$, which is substantially parallel to the geometric axis of the sensing coil and about a third rotation axis, $\theta_3$, which is substantially parallel to its own geometric axis.

7. The fiber optic gyroscope of claim 6, wherein the angle between the second rotation axis, $\theta_2$, and the third rotation axis, $\theta_3$, is non-zero and fixed.

8. The fiber optic gyroscope of claim 6, wherein the angle between the second rotation axis, $\theta_2$, and the third rotation axis, $\theta_3$, is adjustable.

9. A fiber optic gyroscope comprising:
   a sensing coil with a particular magnetic sensitivity magnitude and direction with respect to the geometric axis of the sensing coil; and
   a plurality of magnetic compensators,
   wherein each magnetic compensator is fabricated so as to have a particular magnetic sensitivity magnitude and direction, the magnitude being comparable to that of the sensing coil, with large tolerances relative to the magnitude and direction, and
   wherein the compensators are positioned relative to one another and to the sensing coil such that the combined magnetic sensitivities of the compensators cancel the magnetic sensitivity of the sensing coil.

10. The fiber optic gyroscope of claim 9, wherein each compensator comprises coiled and twisted lengths of optical fiber.

11. The fiber optic gyroscope of claim 9, wherein the compensators are optical devices comprising a material having a magnetic sensitivity due to the Faraday effect.

12. The fiber optic gyroscope of claim 11, wherein each compensator comprises bismuth iron garnet.

13. The fiber optic gyroscope of claim 9, wherein the magnitude of the magnetic sensitivity of any one of the compensators or the sensing coil is not larger than the sum of the magnitudes of the remaining devices.

14. A method of fabricating a fiber optic gyroscope comprising:
   fabricating a sensing coil having a magnetic sensitivity with a measurable magnitude and a direction relative to the geometric axis of the sensing coil;
   providing a plurality of pre-fabricated compensators having magnetic sensitivities comparable in magnitude to that of the sensing coil; and
   positioning two or more of the compensators relative to one another and to the sensing coil such that the combined magnetic sensitivities of the compensators cancel the magnetic sensitivity of the sensing coil.

15. The method of claim 14, wherein each compensator comprises coiled and twisted lengths of optical fiber.

16. The method of claim 14, wherein the compensators are optical devices comprising a material having a magnetic sensitivity due to the Faraday effect.

17. The method of claim 16, wherein each compensator comprises bismuth iron garnet.

18. The method of claim 14, wherein the magnitude of the magnetic sensitivity of any one compensator or the sensing coil is not larger than the sum of the magnitudes of the remaining devices.

19. The method of claim 14, wherein positioning two or more of the compensators comprises rotating a first compensator about a first rotation axis, $\theta_1$, which is substantially parallel to the geometric axis of the sensing coil, and rotating a second compensator about a second rotation axis, $\theta_2$, which is substantially parallel to the geometric axis of the sensing coil and about a third rotation axis, $\theta_3$, which is substantially parallel to its own geometric axis.

20. The method of claim 19, wherein the angle between the second rotation axis, $\theta_2$, and the third rotation axis, $\theta_3$, is non-zero and fixed.

21. The method of claim 19, wherein the angle between the second rotation axis, $\theta_2$, and the third rotation axis, $\theta_3$, is adjustable.

22. A method of assembling a fiber optic gyroscope comprising a sensing coil, a first compensator, and a second compensator, the method comprising:
   positioning the sensing coil, the first compensator, and the second compensator in initial positions, wherein each of the sensing coil, first compensator, and second compensator has a magnetic sensitivity with an axial component and a tangential component;
   positioning the geometric axes of the sensing coil and first compensator substantially parallel and the geometric axis of the second compensator non-parallel to the geometric axis of the sensing coil and the first compensator;
   rotating the second compensator about its own geometric axis, $\theta_3$, until the sum of the axial components of the magnetic sensitivities is substantially zero; and
   rotating the first compensator about a first rotation axis, $\theta_1$, and the second compensator about a second rotation axis, $\theta_2$, until the sum of the tangential components of the magnetic sensitivities is substantially zero.

23. The method of claim 22, wherein the compensators comprise coiled and twisted lengths of optical fiber.

24. The method of claim 22, wherein the compensators are optical devices comprising a material having a magnetic sensitivity due to the Faraday effect.

25. The method of claim 24, wherein each compensator comprises bismuth iron garnet.

26. The method of claim 22, wherein the magnitude of the magnetic sensitivity of the first compensator, second compensator, or sensing coil is not larger than the sum of the magnitudes of the other two.

27. The method of claim 22, wherein the first rotation axis, $\theta_1$, and the second rotation axis, $\theta_2$, are substantially parallel to the geometric axis of the sensing coil.

28. The method of claim 22, wherein the angle between the geometric axes of the sensing coil and the second compensator is non-zero and fixed.

29. The method of claim 22, wherein the angle between the geometric axes of the sensing coil and the second compensator is adjustable.

* * * * *

UNITED STATES PATENT AND TRADEMARK OFFICE
CERTIFICATE OF CORRECTION

| | |
|---|---|
| PATENT NO. | : 7,298,491 B2 |
| APPLICATION NO. | : 11/010217 |
| DATED | : November 20, 2007 |
| INVENTOR(S) | : Olson et al. |

It is certified that error appears in the above-identified patent and that said Letters Patent is hereby corrected as shown below:

In Claim 6 column 7 line 33 the words "can be" should be --is--

Signed and Sealed this

Twenty-third Day of September, 2008

JON W. DUDAS
*Director of the United States Patent and Trademark Office*